(12) United States Patent
Azumai

(10) Patent No.: US 6,693,752 B2
(45) Date of Patent: Feb. 17, 2004

(54) IMAGE FORMING APPARATUS

(75) Inventor: Mitsuo Azumai, Hachioji (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/369,472

(22) Filed: Feb. 20, 2003

(65) Prior Publication Data

US 2003/0161058 A1 Aug. 28, 2003

(30) Foreign Application Priority Data

Feb. 28, 2002  (JP) ........................................ 2002-054117

(51) Int. Cl.[7] ........................... G02B 26/08; G03F 3/08; B41J 2/47
(52) U.S. Cl. ....................... 359/896; 358/518; 347/232; 359/196
(58) Field of Search ................................ 359/196–226, 359/896; 358/474, 505, 518–523, 296; 347/232–235, 225, 248, 250; 250/206.1, 206.2

(56) References Cited

U.S. PATENT DOCUMENTS 5,838,465 A * 11/1998 Satou et al. ................ 358/520
6,421,076 B1 * 7/2002 Asaya ......................... 347/234

* cited by examiner

*Primary Examiner*—James Phan
(74) *Attorney, Agent, or Firm*—Frishauf, Holtz, Goodman & Chick, P.C.

(57) ABSTRACT

An image forming apparatus includes: a pattern generator for generating pattern data for recording a set of test patterns at respective specified positions thereof on the recording sheet; a positional deviation detector for detecting a positional deviation at each characteristic point included in the set of test patterns generated by the pattern generator, in the image data read from the recording sheet on which the image containing the set of test patterns has been formed, by comparing with a position of the proper output at each characteristic point; and a deviation correcting device for calculating operational values for a correction of each pixel with reference to the respective positional deviations of the characteristic points detected by the positional deviation detector and for carrying out a processing to eliminate the positional deviation of each pixel at the time of image formation by using the operational values.

6 Claims, 11 Drawing Sheets

CHARACTERISTIC POINT

FIG. 9 (a) REFERENCE CLOCK
FIG. 9 (b) DL19
FIG. 9 (c) DL20
FIG. 9 (d) DL21
FIG. 9 (e) DL22
FIG. 9 (f) DL23
FIG. 9 (g) DL24
FIG. 9 (h) DL25
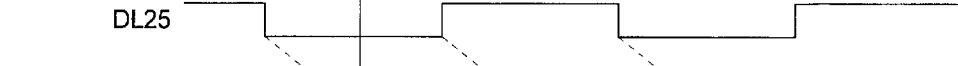
FIG. 9 (i) DL46
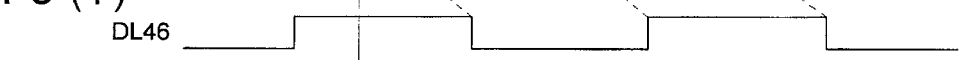
FIG. 9 (j) DL47
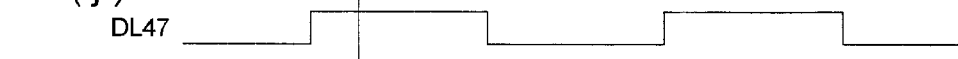
FIG. 9 (k) DL48
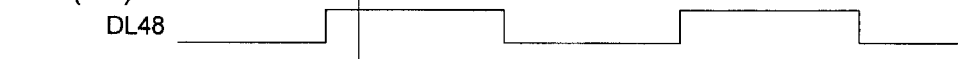
FIG. 9 (l) DL49
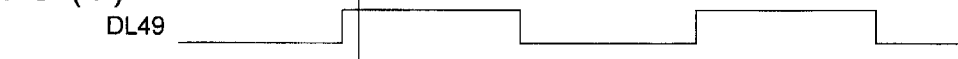
FIG. 9 (m) DL50
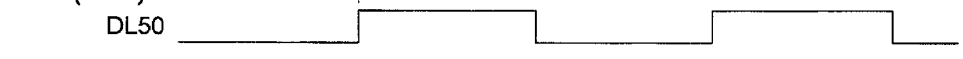
FIG. 9 (n) DL51

IMAGE FORMING APPARATUS

BACKGROUND OF THE INVENTION

This invention relates to an image forming apparatus, and in particular, to an image forming apparatus capable of eliminating various kinds of deviation such as distortion and positional deviation in an image formed on a recording sheet.

A copying machine, a printer, a facsimile apparatus, etc. (These are hereinafter referred to as "image forming apparatus" collectively.) are equipped with a function to form an image on a recording sheet.

Further, among image forming apparatus of this kind, there is one wherein a latent image is formed on a photoreceptor by means of a laser beam, the latent image is made a toner image, and this toner image is transferred and fixed to a recording sheet.

Further, in such an image forming apparatus using a laser beam, a polygonal mirror and an fθ lens are used for the scanning of the photoreceptor by the laser beam. Therefore, caused by deviation of the characteristics of the fθ lens from the ideal ones, chromatic aberration of the fθ lens, inclination of the polygonal mirror from the ideal direction, deviation of the polygonal mirror from the ideal position, deviation of the reflection angle characteristic of the polygonal mirror from the ideal one, deviation of the position and inclination of the mounting of the photoreceptor from the ideal values, etc., positional deviation, inclination, and distortion of an image (These are hereinafter referred to as "deviations" collectively.) are produced, which makes a cause of image degradation.

Further, in a color image forming apparatus of a tandem type for forming a color image, there are a plurality of fθ lenses, polygonal mirrors, laser beams, and photoreceptors in accordance with the number of colors of an image to be formed, and deviations in these components present a registration error in a color image.

For the purpose of correcting the above-mentioned deviations, there exist several methods. The first method is such that exposure beam is detected by a sensor and registration correction is carried out. In this first method, the main object is to adjust the starting position in the main scanning direction. The second method is such that an image on the intermediate transfer member is read by an image sensor and registration correction is carried out. In this second method, the main object is the positional adjustment of a specified portion in the main/sub-scanning directions. The third method is such that an image of a specified pattern is formed, and this image of the specified pattern is read by a scanner. The main object of this third method is inspection.

That is, in any one of the above-mentioned first method to third method, it has never been taken into consideration to carry out the correction of an image distortion and a registration error in a color image for each pixel on the whole surface of the image at an accuracy within one dot.

SUMMARY OF THE INVENTION

This invention was made in view of the above-mentioned problem, and it is its object to realize an image forming apparatus capable of carrying out the correction of image distortion and registration error in a color image for each pixel on the whole image surface at a high accuracy.

Further, it is its another object to realize an image forming apparatus capable of carrying out the correction of an image distortion and a registration error in a color image for each pixel on the whole image surface at an accuracy within one dot.

That is, the above-mentioned objects are accomplished by any one of the structures (1) to (6) described below.

(1) An image forming apparatus characterized by comprising an image forming means for forming an image on a recording sheet on the basis of image data and outputting it, an image reading means for reading an image on a document and generating image data, a pattern generating means for generating pattern data for recording a set of test patterns at their respective specified positions on a recording sheet, a positional deviation detecting means for detecting the positional deviation from the position of the proper output at each characteristic point included in the set of test patterns generated by said pattern generating means, and a deviation correcting means for calculating operational values for the correction of each pixel with reference to the respective positional deviations of the characteristic points detected by said positional deviation detecting means and carrying out a processing to eliminate the positional deviation of each pixel in image formation by the use of said operational values, thereby the deviation or the inclination of an image when said image is read by said image reading means, can be corrected.

In this structure, the respective positional deviations of characteristic points, which are included in the set of test patterns from image data obtained by the reading of the recording sheet having the image of said set of test patterns recorded on it, from the positions of their proper output are detected. Then, by the calculation of operational values for the correction of each pixel with reference to the detected positional deviation of the characteristic points and the use of said operational values, a processing to eliminate positional deviation or inclination in image formation is carried out.

As the result of this, it is possible to carry out the correction of image distortion for each pixel of the whole image surface.

(2) An image forming apparatus comprising an image forming means for forming an image on a recording sheet on the basis of image data and outputting it, an image reading means for reading an image on a document and generating image data, a pattern generating means for generating pattern data for recording a set of test patterns at their respective specified positions on a recording sheet, a positional deviation detecting means for detecting the positional deviation from the position of the proper output at each characteristic point included in the set of test patterns generated by said pattern generating means, and a deviation correcting means for calculating operational values for the correction of each pixel with reference to the respective positional deviations of the characteristic points detected by said positional deviation detecting means and carrying out a processing to eliminate the positional deviation of each pixel in image formation by the use of said operational values, which is characterized by the positional deviation to be detected by said positional deviation detecting means and the positional deviation to be corrected by said deviation correcting means being deviations in the main scanning direction and in the sub-scanning direction.

In this structure, the respective positional deviations of characteristic points, which are included in the set of test patterns from image data obtained by the reading of the recording sheet having the image of said set of test patterns recorded on it, from the positions of their proper output are detected. Then, by the calculation of operational values for the correction of each pixel with reference to the detected positional deviation of the characteristic points and the use of said operational values, a processing to eliminate positional deviation or inclination in image formation is carried out.

Further, in this structure, because the positional deviation to be detected and the positional deviation to be corrected are deviations in the main scanning direction and in the sub-scanning direction, it is possible to carry out the correction of image distortion at a high accuracy for each pixel of the whole image surface.

(3) An image forming apparatus comprising an image forming means for forming an image on a recording sheet on the basis of image data and outputting it, an image reading means for reading an image on a document and generating image data, a pattern generating means for generating pattern data for recording a set of test patterns at their respective specified positions on a recording sheet, a positional deviation detecting means for detecting the positional deviation from the position of the proper output at each characteristic point included in the set of test patterns generated by said pattern generating means, and a deviation correcting means for calculating operational values for the correction of each pixel with reference to the respective positional deviations of the characteristic points detected by said positional deviation detecting means and carrying out a processing to eliminate the positional deviation of each pixel in image formation by the use of said operational values, which is characterized by said deviation correcting means comprising a delay means for generating a plurality of clocks having the phase shifted stepwise by 1/n of the period from a basic clock, a selection means for selecting, at the time of correction of a positional deviation in the main scanning direction, a clock in accordance with the amount of the positional deviation, and an output means for outputting an image signal at a specified timing based on said selected clock.

In this structure, it is put into practice that a plurality of delayed clocks having the phase shifted stepwise by 1/n of the period from a basic clock are generated, at the time of correction of a positional deviation in the main scanning direction, a delayed clock is selected in accordance with the amount of the positional deviation, and an image signal is outputted at a specified timing based on said selected clock.

As the result of this, for each pixel of the whole image surface, it is possible to carry out the correction of image distortion and registration error in a color image at a specified position on a recording sheet at a high accuracy with a step smaller than one clock period (1/n of one clock period).

(4) An image forming apparatus comprising an image forming means for forming an image on a recording sheet on the basis of image data and outputting it, an image reading means for reading an image on a document and generating image data, a pattern generating means for generating pattern data for recording a set of test patterns at their respective specified positions on a recording sheet, a positional deviation detecting means for detecting the positional deviation from the position of the proper output at each characteristic point included in the set of test patterns generated by said pattern generating means, and a deviation correcting means for calculating operational values for the correction of each pixel with reference to the respective positional deviations of the characteristic points detected by said positional deviation detecting means and carrying out a processing to eliminate the positional deviation of each pixel in image formation by the use of said operational values, which is characterized by said deviation correcting means comprising a delay means for generating a clock different from a basic clock in the timing by a specified interval, a state detecting means for detecting the delay state of said delay means, that is, to which stage of said delay clock a certain pulse of said basic clock corresponds, a selection means for selecting, with reference to said delay state, at the time of correction of a positional deviation in the main scanning direction, a delayed clock from said delay means in accordance with the amount of the positional deviation, and an output means for outputting an image signal at a specified timing based on said selected delayed clock.

In this structure, it is put into practice that, when a delayed clock different from a basic clock in the timing by a specified interval is generated, the delayed state, that is, to which stage of said delayed clock a certain pulse of said basic clock corresponds, is detected, at the time of correction of a positional deviation in the main scanning direction, a delayed clock is selected in accordance with the amount of the positional deviation with reference to said delayed state, and an image signal is outputted at a specified timing based on said selected clock.

As the result of this, even though the delayed clock generated by the delay means fluctuates owing to various kinds of factor, it is possible to carry out, for each pixel of the whole image surface, the correction of an image distortion and a registration error in a color image at a specified position on a recording sheet at a high accuracy with a step smaller than one clock period.

(5) An image forming apparatus as set forth in any one of the structures (1) to (4), characterized by having a structure which is capable of forming a color image, reading a color image, and detecting positional deviation in a color image, and correcting a registration error for colors composing a color image.

In this structure, an image forming apparatus has a structure which is capable of forming a color image, reading a color image, and detecting positional deviation in a color image, and corrects a registration error for colors composing a color image.

As the result of this, it is possible to carry out, for each pixel in the whole image pixel, the correction of image distortion and colors being out of registration in a color image at a high accuracy.

(6) An image forming apparatus as set forth in any one of the structures (1) to (5), characterized by the aforesaid positional deviation detecting means detecting the corner positions of a recording sheet and applying the information on said corner positions to the detection of positional deviations.

In this structure, it is put into practice that the corner positions of a recording sheet are detected by the positional deviation detecting means, and the information on said corner positions is applied to the detection of positional deviations.

As the result of this, it is possible to carry out, for each pixel in the whole image pixel, the correction of an image distortion and a registration error in a color image at a specified position on a recording sheet at a high accuracy.

BRIEF DESCRIPTION OF THE PREFERRED EMBODIMENT

Figure 3:
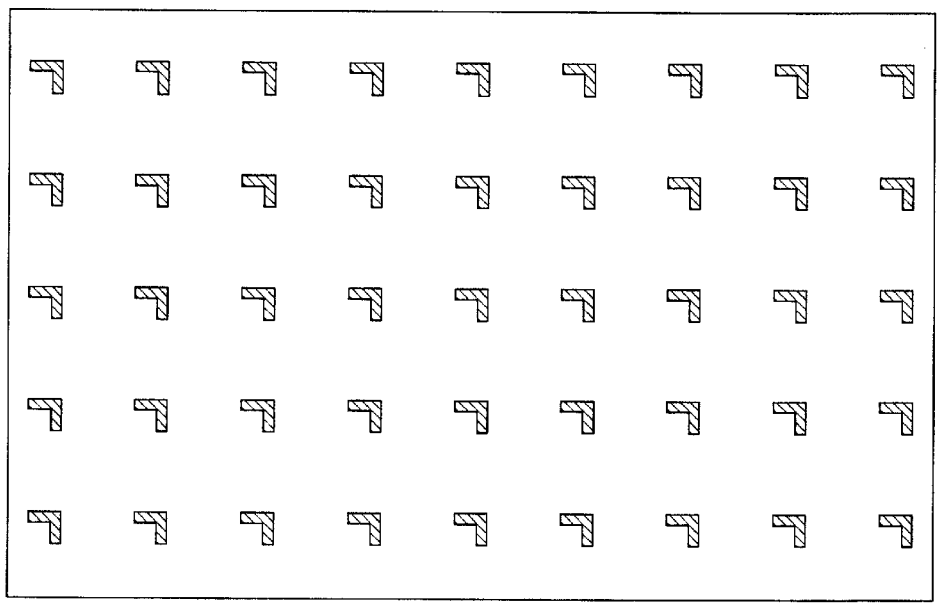
Figure 3:
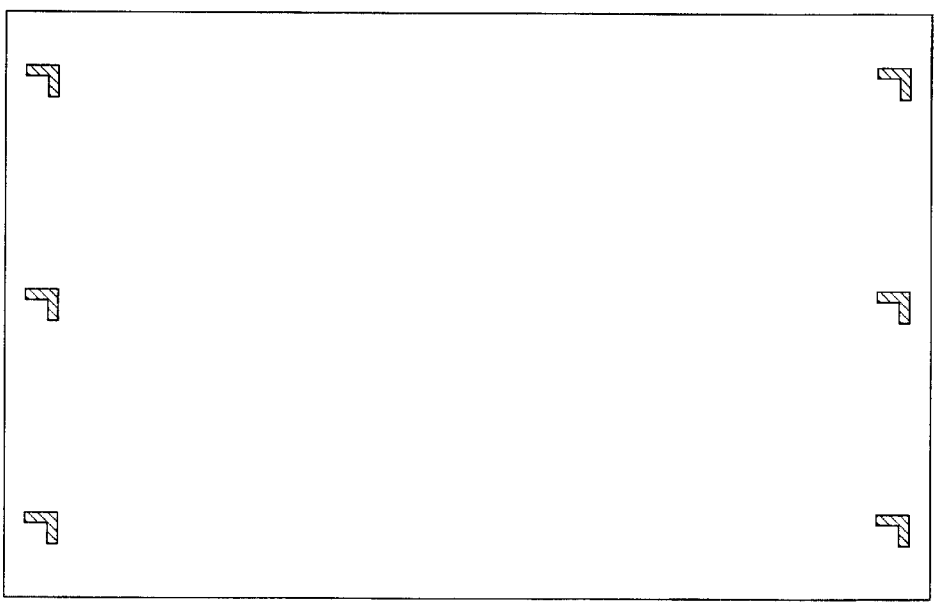
Figure 4:
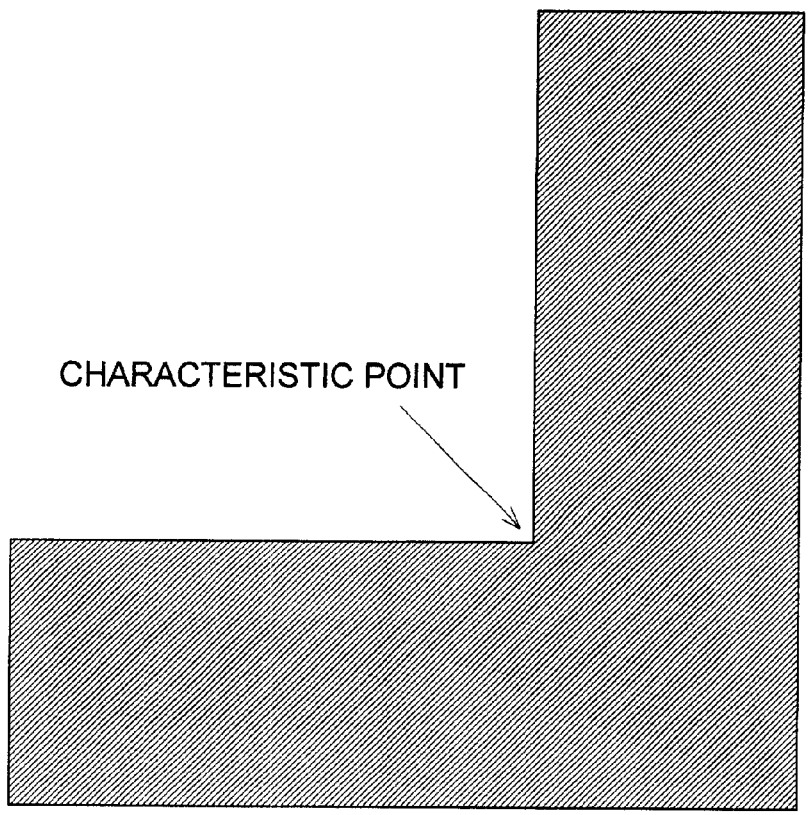
Figure 4:
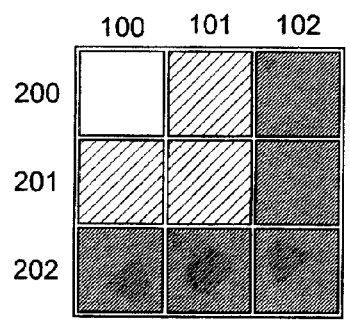
Figure 5:
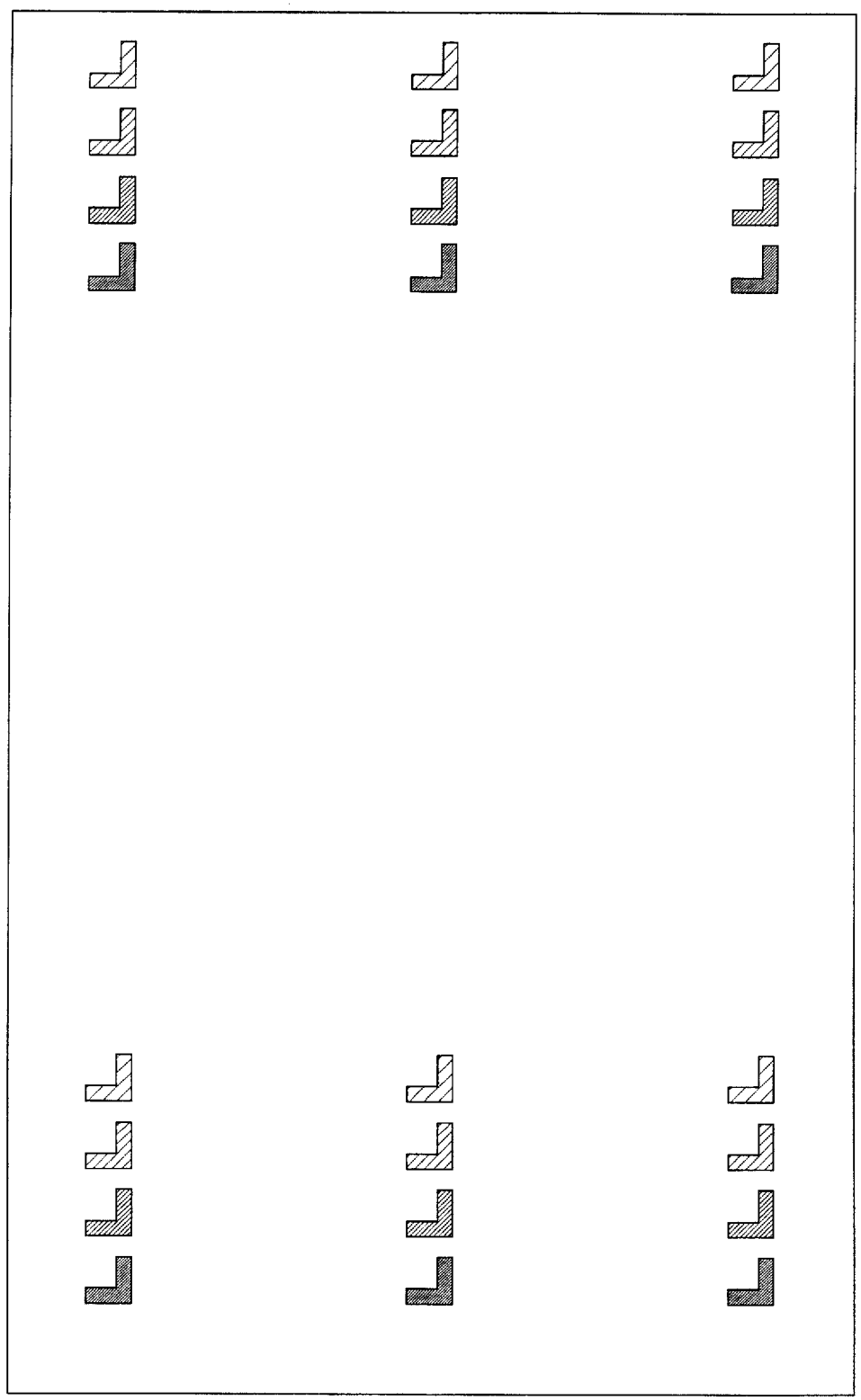
Figure 6:
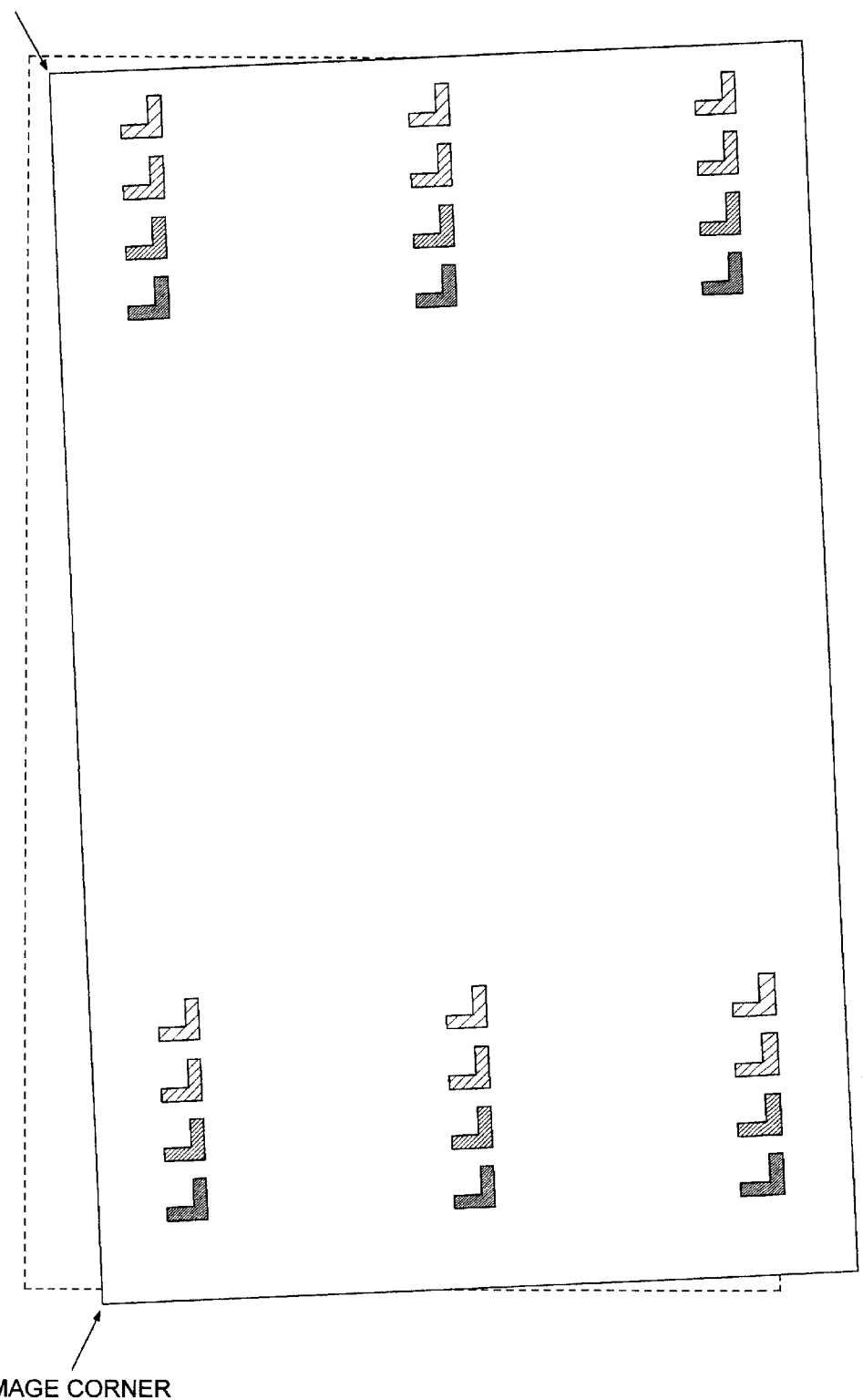
Figure 7:
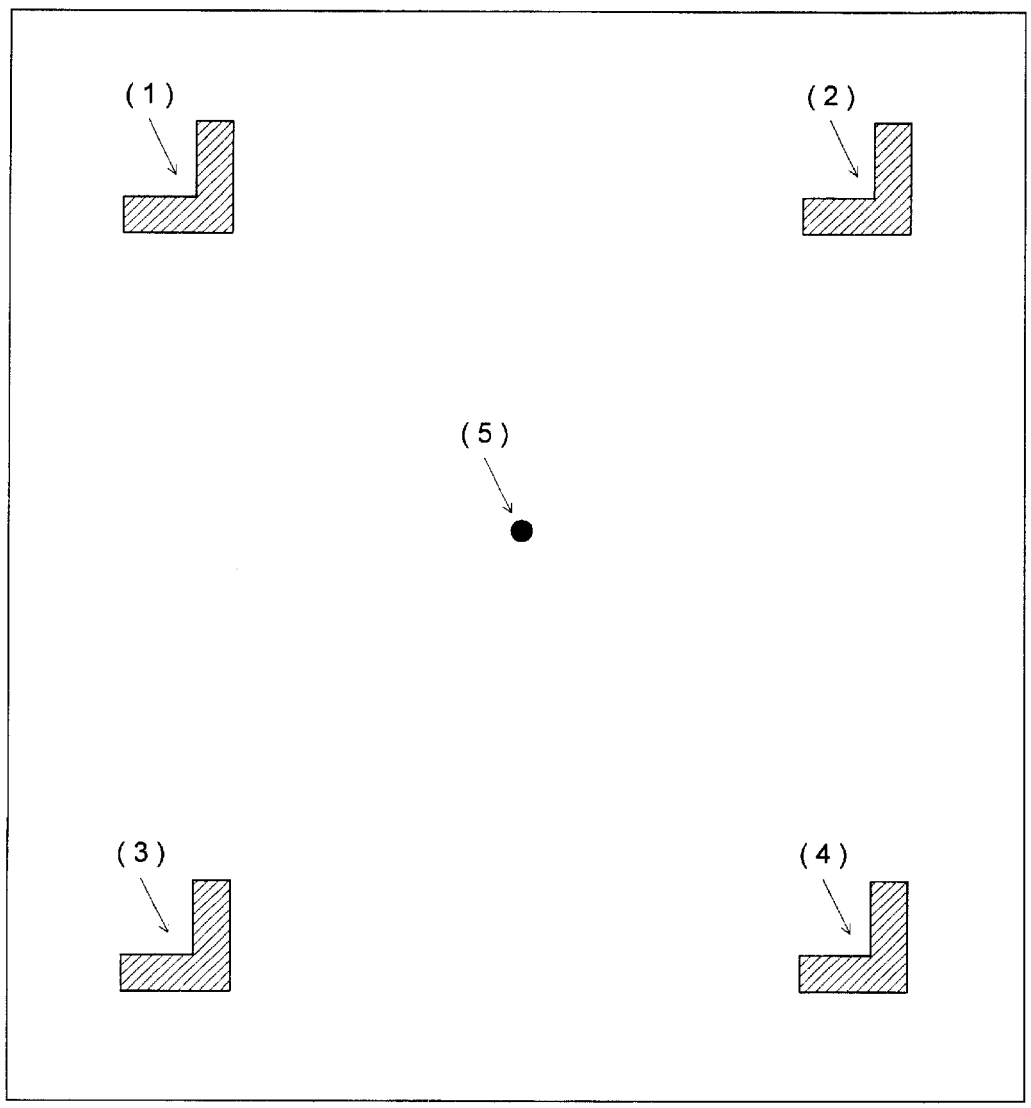
Figure 8:
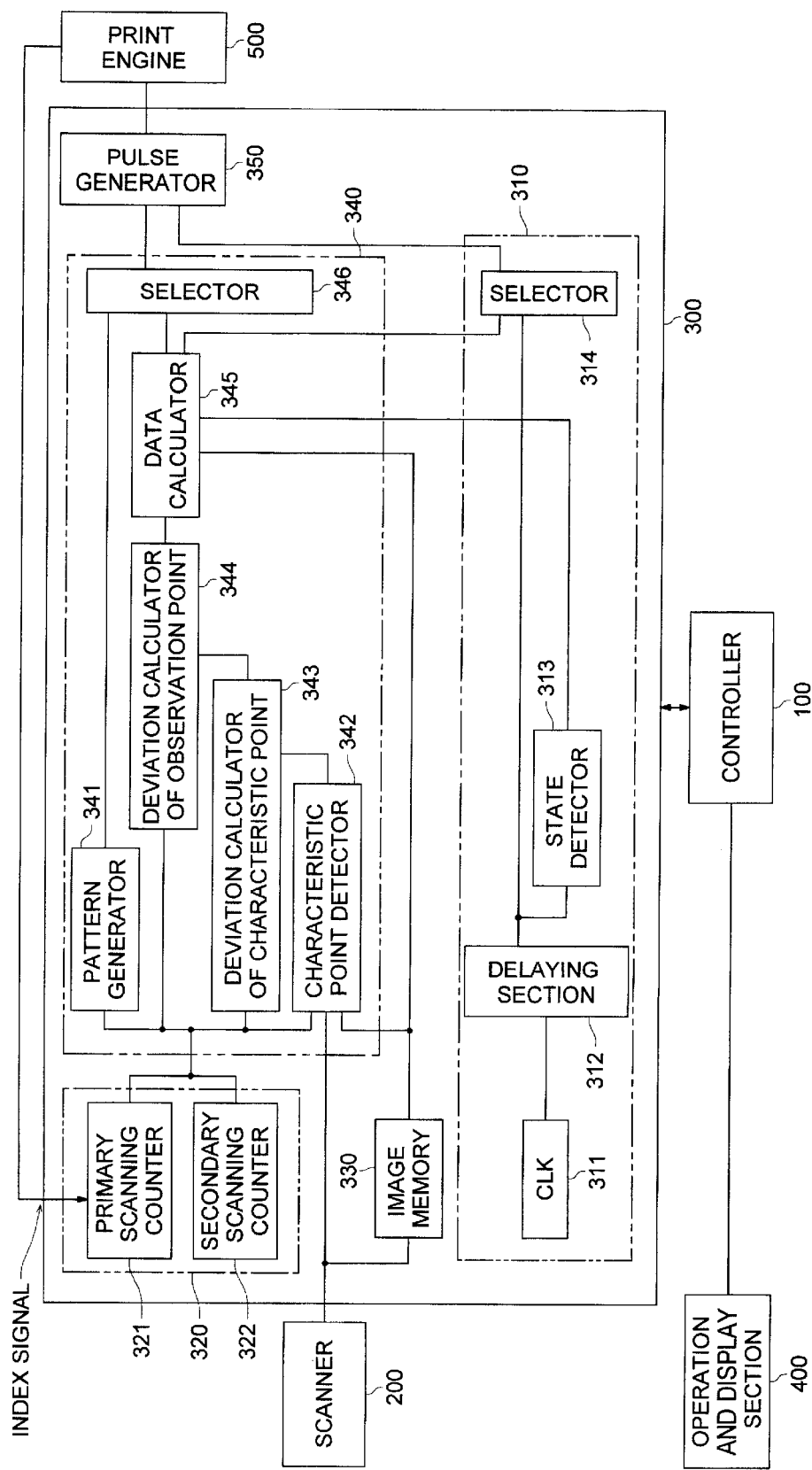
Figure 10:
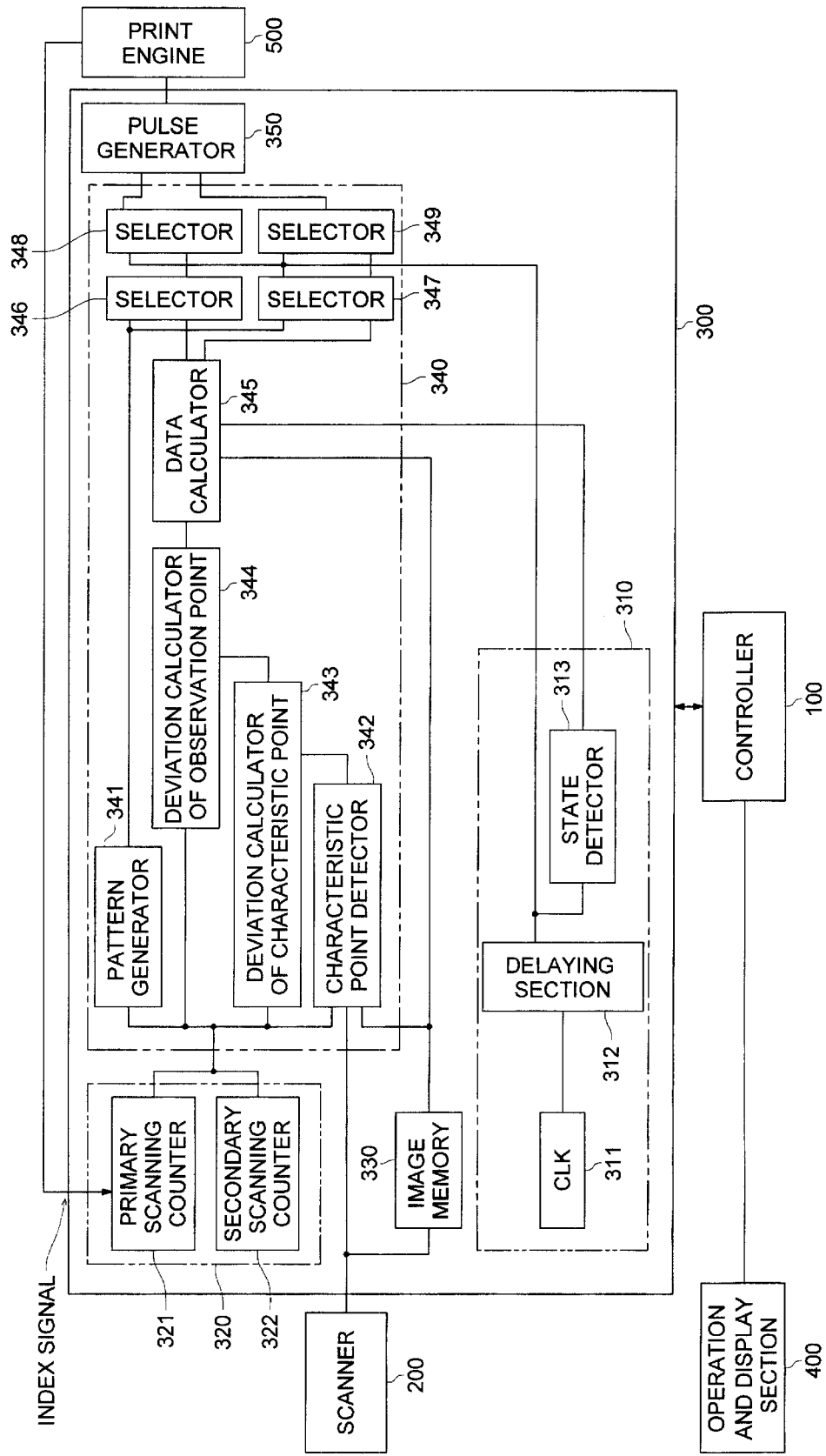

FIG. 3(a) and FIG. 3(b) are illustrative drawings showing how a test pattern appears on a recording sheet in the Embodiment of this invention;

FIG. 4(a) to FIG. 4(b) are illustrative drawings showing how a test pattern appears on a recording sheet in the Embodiment of this invention;

FIG. 5 is an illustrative drawing showing how a test pattern appears on a recording sheet in the Embodiment of this invention;

FIG. 6 is an illustrative drawing showing how a test pattern appears on a recording sheet in the Embodiment of this invention;

FIG. 7 is an illustrative drawing showing how a test pattern appears on a recording sheet in the Embodiment of this invention;

FIG. 8 is a functional block diagram showing the electrical structure of an image forming apparatus of an Embodiment 2 of this invention;

FIG. 9(a) to FIG. 9(n) are time charts showing the operation of an image forming apparatus of the Embodiment of this invention;

FIG. 10 is a functional block diagram showing the electrical structure of an image forming apparatus of an Embodiment 3 of this invention; and FIG. 11(a) to FIG. 11(i) are illustrative drawings showing the operation and effect of an image forming apparatus of each Embodiment of this invention.

DETAILED DESCRIPTION OF THE PREFERRED EMBODIMENT

In the following, examples of the embodiment will be explained in detail with reference to the drawings.
(Embodiment 1)

Figure 1:
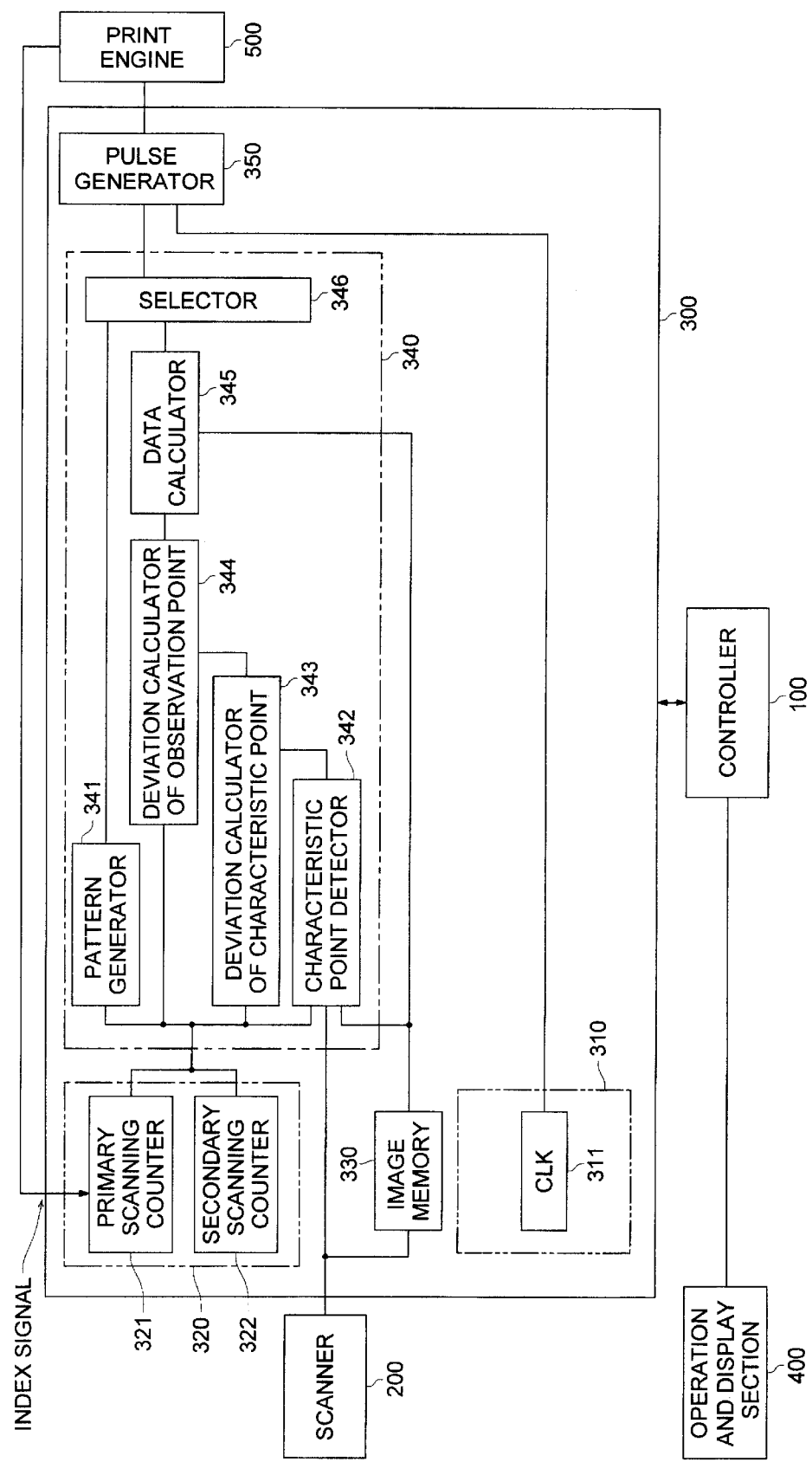
FIG. 1 is a functional block diagram showing the electrical structure of an image forming apparatus of an Embodiment 1 of this invention.

FIG. 1 is a block diagram showing the detailed electrical structure of an image forming apparatus of the Embodiment 1. In this Embodiment 1, explanations will be given with an image forming apparatus as a copying machine equipped with a scanner taken for a specific example.

Numeral 100 denotes a controller for carrying out the control of various parts, numeral 200 denotes a scanner for reading an image on a document, numeral 300 denotes an image processing section for carrying out the correction of deviations in this example of the embodiment, numeral 400 denotes an operation-and-display section for carrying out operational input and various kinds of display, and numeral 500 denotes a print engine for carrying out image formation.

Further, in the image processing section 300, numeral 310 denotes a clock generator and is equipped with a basic clock generator for generating a basic clock CLK. Numeral 320 denotes a counter subsection and counts a position which is being scanned by a laser beam for image formation in the print engine 500 by means of a main scanning counter 321 and a sub-scanning counter 322. Numeral 330 denotes an image storage for temporarily storing image data from the scanner. Numeral 350 denotes a pulse generator for generating a PWM signal for image formation on the basis of image data subjected to deviation correction or a clock subjected to deviation correction.

Numeral 340 denotes a deviation correction subsection and is equipped with 341 to 346 described below. Numeral 341 denotes a pattern generator for generating pattern data for recording a set of test patterns each of which has a characteristic point at a specified position on a recording sheet, numeral 342 denotes a characteristic point detector for detecting the position of a test pattern (desirably a characteristic point included in a test pattern) from image data obtained by the reading of a recording sheet having the image of said set of test patterns recorded on it by means of said scanner 200, numeral 343 denotes a deviation calculator of a characteristic point for detecting a positional deviation from the position of proper output of said characteristic point, numeral 344 denotes a deviation calculator of a remark point for obtaining the amount of deviation as an operational value at the position of a pixel (the remark point) for which the correction of deviation is to be carried out at the time of image formation, and numeral 345 denotes a data calculator for carrying out a data operation processing to eliminate the positional deviation of each pixel at the time of image formation by the use of said operational value. Numeral 346 denotes a selector for letting selectively test pattern data and image data having been subjected to deviation correction pass.

In addition, the "deviation correcting means" referred to in the structures (1) to (6) consists of the above-mentioned deviation calculator of a remark point 344 and the above-mentioned data calculator 345.

Figure 2:
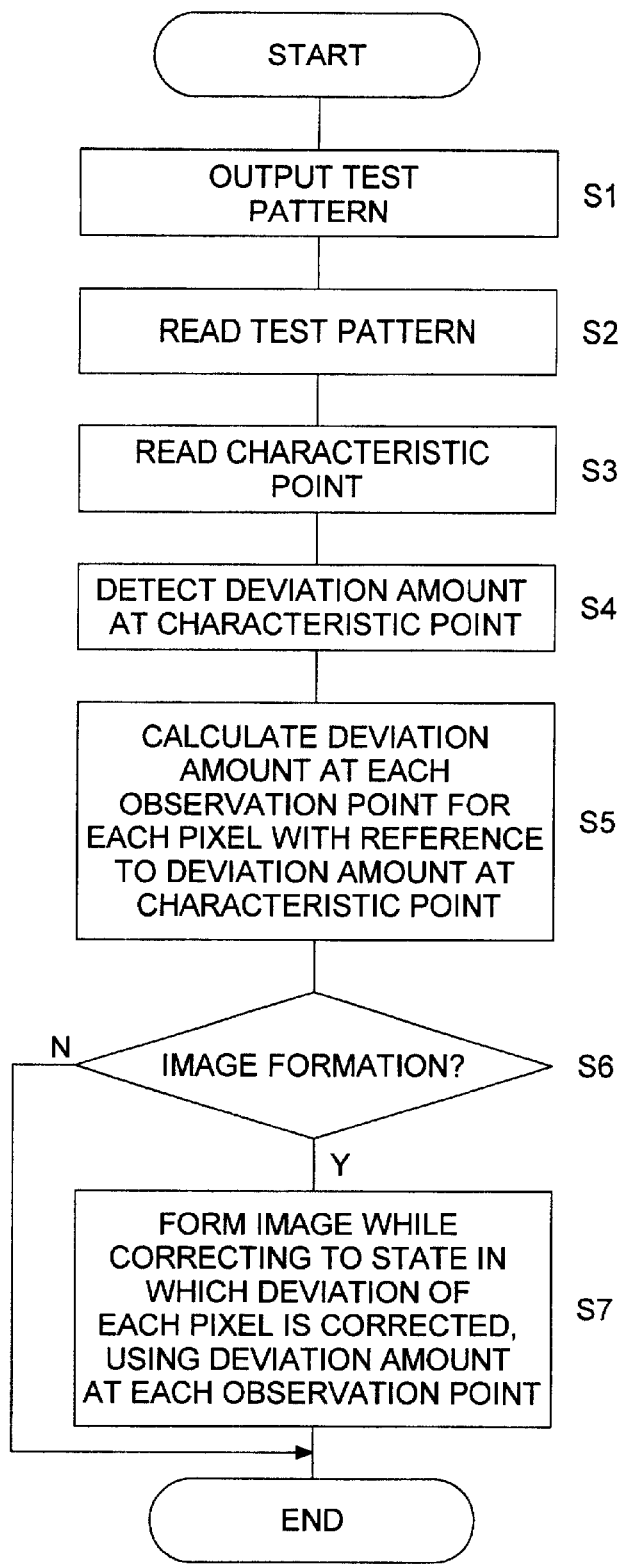
FIG. 2 is a flow chart showing the procedure of the operation and the method of adjusting image formation of an image forming apparatus of the Embodiment of this invention.

In the following, the operation of this Embodiment 1 will be explained with reference to the flow chart shown in FIG. 2.

First, pattern data for outputting a set of specified test patterns on a recording sheet are generated by the pattern generator 341. These pattern data pass the selector 346, a PWM signal corresponding to the pattern data is generated in the pulse generator, and a recording sheet having the image of the set of test patterns formed on it is outputted from the print engine 500 (S1 in FIG. 2).

An example of the state where this set of test patterns are recorded is shown in FIG. 3(a). In this example, at each of 6 points, namely, the upper left, the upper center, the upper right, the lower left, the lower center, and the lower right portions on a recording sheet, a test pattern is recorded. As regards the number and the position of the arrangement of these test patterns, they are not limited to this example shown here, but it is necessary for the position to include at least the neighborhood of 4 corners of a recording sheet.

Further, in the case where there are at the minimum 4 pieces of the test pattern, namely 2 pieces in the main scanning direction and 2 pieces in the sub-scanning direction, only a deviation increasing or decreasing linearly can be corrected; however, by the further arrangement of a number of test patterns as shown in FIG. 3(b), it becomes possible to cope with a distortion as a curved line. For this reason, it is desirable to arrange test patterns as many as possible. Therefore, it is desirable to arrange test patterns more than those shown in FIG. 3(b).

Besides, an enlarged drawing of a test pattern is shown in FIG. 4(a). In this drawing, there is shown an example of an L-shaped pattern such that a horizontal line segment and a vertical line segment meet each other. In this case, from the viewpoint of the ease of detection, the meeting portion is defined as the "characteristic point". In addition, as regards the shape of the test pattern and the position of the characteristic point included in the test pattern, they are not to be limited to this example.

Further, in the case of monochromatic image formation, the arrangement is such one as shown in FIG. 3(a) or FIG. 3(b); however, in the case of color image formation, it is appropriate to arrange test patterns of the component colors (for example, 4 colors of Y, M, C, and K) as shown in FIG. 5. This FIG. 5 shows an example corresponding to the above-mentioned example shown in FIG. 3(A), and it is also appropriate to arrange more number of test patterns as shown in FIG. 3(b).

Then, the recording sheet having test patterns outputted in this way recorded on it is read by the scanner 200 (S2). Further, it is necessary to read (to extract) the characteristic points of the test patterns at a high accuracy (S3).

Further, in order to read the characteristic point with a good accuracy, for example, a pattern matching process is carried out by means of a window having 3×3 cells as shown in FIG. 4(b). Then, it is assumed that matching is made at the position=(100 to 102:200 to 202). Now, let the square of white color inside have density zero (0/255), the squares shaded by fine hatching have the full density (255/255), and the squares shaded by coarse hatching have a middle density.

Then, corresponding to the middle density, for example, the density variation point of the two hundredth line=101+10/255, and this value is regarded as the coordinates in the main scanning direction. Further, corresponding to the middle density, for example, the density variation point of the one hundredth dot=200+70/255, and this value is regarded as the coordinates in the sub-scanning direction.

Further, in order to raise the accuracy of the coordinates of the characteristic point, it is considered, for example, to make the size of the window larger, to calculate the coordinates by the averaging operation of plural image data of middle density, or to estimate a linear function by means of a method of least squares in case coordinates of plural density change points are different form each other.

Further, as regards a characteristic point which has been extracted in the above-mentioned way, the amount of deviation between the proper position in the case of no distortion produced in image formation and the position actually extracted is obtained for the main scanning direction and sub-scanning direction (S4).

In the proper outputting of an image, the amount of deviation of a corresponding remark point is calculated on the basis of the amount of deviation in the main scanning and sub-scanning directions of characteristic points surrounding the corresponding remark point. Then, the image data corresponding to the deviated pixels are read out and employed for image formation.

It is defined that $(\Delta X(c, i, j), \Delta Y(c, i, j))$=(the coordinates of a characteristic point (color c, position i, j) read by the scanner)−(the coordinates of the characteristic point (color c, position i, j) to be printed), where c=Y (yellow), M (magenta), C (cyan), or K (black), and i=0 to m, j=0 to m.

It is necessary to remove the portion of the deviations caused by the positional deviation or the inclination of the image as a whole before the processing of this example of the embodiment is practiced. Incidentally, in the case of an image forming apparatus of a laser beam type, it is considered that a difference in extension or contraction in the sub-scanning direction due to the difference of color is never produced; therefore, this characteristic is to be utilized.

First, let (K, 0, 0), (K, 0, n) and (K, m, 0) be three characteristic points to be used in the above-mentioned correction. The amount of deviation for above three characteristic points of (K, 0, 0), (K, 0, n) and (K, m, 0) are $(\Delta X(K, 0, 0), \Delta Y(K, 0, 0))$, $(\Delta X(K, 0, n), \Delta Y(K, 0, n))$, and $(\Delta X(K, m, 0), \Delta Y(K, m, 0))$, respectively.

It is estimated that the amount of deviation becomes linear between i=0 and i=m as well as between j=0 and j=n, respectively.

For all the characteristic points,
it is necessary to remove the error in the main scanning direction:

$$\Delta X(K, 0, 0)+(i/m)\times(\Delta X(K, m, 0)-\Delta X(K, 0, 0))+(j/n)\times(\Delta X(K, 0, n)-\Delta X(K, 0, 0)),$$

and
it is necessary to remove the error in the sub-scanning direction:

$$\Delta Y(K, 0, 0)+(i/m)\times(\Delta Y(K, m, 0)-\Delta Y(K, 0, 0))+(j/n)\times(\Delta Y(K, 0, n)-\Delta Y(K, 0, 0)).$$

Hence, the amount of deviation to be corrected in the proper outputting of an image at a characteristic point is:
In the main scanning direction, $$\gamma X(c, i, j)=\Delta X(c, i, j)-(\Delta X(K, 0, 0)+(i/m)\times(\Delta X(K, m, 0)-\Delta X(K, 0, 0))+(j/n)\times(\Delta X(K, 0, n)-\Delta X(K, 0, 0)),$$

and
in the sub-scanning direction, $$\gamma Y(c, i, j)=\Delta Y(c, i, j)-(\Delta Y(K, 0, 0)+(i/m)\times(\Delta Y(K, m, 0)-\Delta Y(K, 0, 0))+(j/n)\times(\Delta Y(K, 0, n)-\Delta Y(K, 0, 0)).$$

Incidentally, when a recording sheet having the image of a set of test patterns formed on it is read by the scanner 200, sometimes the image as a whole has a deviation or an inclination with respect to a reference position which is supposed at the time of generation of the test patterns (refer to FIG. 6). Then, because the positions of the characteristic points are read with the above-mentioned deviation or inclination included, it is necessary to apply a correction operation to the positional deviation values at all the characteristic points.

Further, it is necessary to conduct the correction operation under the conditions that:

(1) the position of image formation with respect to the photoreceptor drum is always constant without changing its image forming position for each image forming operation in the case of both output of test patterns and output of copying. In this case, as explained before, image distortion or shift due to physical problems of the writing system may be caused;

(2) the transfer position on a recording sheet with respect to an image on the photoreceptor drum is always constant without changing its transfer positions for each transferring operation in the case of both output of test patterns and output of copying. In this case, prescribed image inclination or shift may be caused; and (3) the placing position of the original document is also always constant without changing its placement position for each reading operation of the output test patterns and in case of copying. In this case, prescribed image inclination or shift may be caused.

Then, the principle of correction will be explained as follows.

The test patterns are generated from the pattern generator, in primary and secondary scanning directions on the basis of respective specified reference signals.

The coordinates system is considered with reference to this system as follows.

The rectangle with a broken line shown in FIG. 6 is considered to be a recording sheet in which shifts indicated above items (1) through (3) is not generated at all, while the rectangle with a solid line is considered to be a recording sheet in which the shift indicated in above item (3) is generated.

On the other hand, the images of test patterns in FIG. 6 are also images in which the shift indicated in above item (3) is generated. Actual images, however, become images to which the shifts indicated in items (1) and (2) are added. That is, a shift to which the shifts indicated in items (1) through (3) are added is generated in the actual images of test patters.

The shifts of items (1) through (3) have been generated immediately before the outputting of test patterns, reading and calculation thereof, and the amount of the shifts is obtained by the calculation.

Similarly, during normal copying operation, the shifts indicated in above items (1) through (3) are generated, although the order of generation of the shifts differs. However, it is necessary to correct images with respect to only the items (1) and (2) in the case of copying operation.

The amount of the shift indicated in item (3) can be obtained by finding the coordinates at the corner portions of a recording sheet through the method described before. The amount of shift of an image to which the shits of items (1) to (3) are added is obtained by finding the shift of the image with respect to the recording sheet through the method described before. In copying operation, the amount of a shift necessary for correction of image data to which the shifts of above items (1) and (2) are added is obtained by deduction.

Further, if the corner portions of a recording sheet is made capable of being detected by a similar pattern matching process, and the corner portions are used as the substitutes for the characteristic points (K, 0, 0) and (K, 0, n), it becomes possible to correct the inclination or the positional deviation against the recording paper sheet by a similar operation.

Further, as regards the above-mentioned characteristic points, the amounts of deviation between the proper position and the actually extracted position in the main scanning direction and in the sub-scanning direction are stored in the image storage 330 or the like.

Further, for every pixel as a remark point, the amount of deviation of the remark point is calculated from the amount of deviation of the specified number of characteristic points obtained in the above-mentioned way, and is stored in the image storage 330 or the like (S5).

The amount of deviation of a remark point can be calculated on the basis of the amount of deviation of characteristic points surrounding the remark point. For example, The amount of deviation of the remark point (5) in FIG. 7 can be calculated on the basis of the amount of deviation of characteristic points ((1), (2), (3), and (4) in FIG. 7) surrounding the remark point. In addition, in this case, as regards a remark point located at the edge portion of a recording sheet, there are not always characteristic points surrounding the remark point; however, even if plural characteristic points are present in one side only, it is possible to make calculation by analogical inference.

Let the coordinates of a remark point be (x, y), the color be c, and the coordinates of 4 characteristic points surrounding it be (X(c, i, j), Y(c, i, j)),
(X(c, i+1, j), Y(c, i+1, j)),
(X(c, i, j+1), Y(c, i, j+1)),
(X(c, i+1, j+1), Y(c, i+1, j+1))

Then, the following inequalities can be obtained.

$X(c, i, j) \leq x < X(c, i+1, j)$,
$X(c, i, j+1) \leq x < X(c, i+1, j+1)$,
$Y(c, i, j) \leq y < Y(c, i, j+1)$,
$Y(c, i+1, j) \leq y < Y(c, i+1, j+1)$.

Then, the amount of positional deviation at the remark point is calculated by interpolation in the following way:

$$\gamma x = \gamma X(c, i, j) + (x - X(c, i, j))/(X(c, i+1, j) - X(c, i+1, j)) \times \gamma X(c, i+1, j),$$

$$\gamma y = \gamma Y(c, i, j) + (y - Y(c, i, j))/(Y(c, i, j+1) - Y(c, i, j+1)) \times \gamma Y(c, i, j+1).$$

In addition, it is possible to use a method of operation other than that shown in the above such as an interpolation operation by the use of 4 data or the like.

Further, in the case where image formation is carried out subsequently to the output of test patterns (in the case of Y in S6), while the amount of positional deviation obtained in the above-mentioned way for every pixel regarded as a remark point is being read out, image data of the pixel at the deviated position are read out and applied to image formation. In another way, it is done to apply image data read out from the image storage 330 to the image formation at the corrected position (FIG. 7). In this case, it is possible to practice the process, in accordance with the deviation at every pixel, by the shifting of the timing of the readout clock from the image storage 330 or of the writing clock, or of the output timing of the PWM signal.

Further, in the case where the amount of deviation is not equivalent to one pixel unit, the corresponding pixel does not coincide with a certain pixel. Therefore, the image data of the corresponding pixel can be obtained by interpolation operation from the image data of pixels in its neighborhood.

That is, let $\lambda(x, y)$ be defined as image data at the coordinates (x, y). Then, as regards image data of a remark point, it is appropriate to read out image data $\lambda(x+\gamma x, y+\gamma y)$ from the image storage 330 to apply them to image formation.

However, because $\gamma x$ and $\gamma y$ are not integers but real numbers, the image data at the remark point is determined to be $(1-\text{Dec}(x+\gamma x)) \times \lambda(\text{Int}(x+\gamma x) + \text{Dec}(x+\gamma x) \times \lambda(\text{Int}(x+\gamma x+1))$ by an interpolation operation, where $\text{Int}(x+\gamma x)$ and $\text{Dec}(x+\gamma x)$ are a function to give the integer part of $(x+\gamma x)$ and a function to give the decimal part of $(x+\gamma x)$ respectively. In addition, it is possible to use a method of operation other than that shown in the above such as an interpolation operation by the use of 4 data in its neighbor or the like.

Moreover, by the practice of the above-mentioned processing for each of the colors used in image formation (for example, 4 colors of Y, M, C, and K), respective images of the colors are formed at their proper positions; therefore, registration error in the color image is also eliminated.

As the result of this, by this example of the embodiment, for each pixel of the whole image surface, an image forming apparatus capable of carrying out the correction of image distortion and registration error in a color image at a high accuracy can be actualized.

(Embodiment 2)

FIG. 8 is a block diagram showing the structure of the Embodiment 2 of this invention. The same sign is attached to the same items as those shown in FIG. 1, and repeated explanations will be omitted.

Numeral 310 denotes a clock generator, and in this Embodiment, it outputs a clock with a timing to correct deviations in accordance with the amount of deviation at each remark point (each pixel). That is, this clock generator 310 is capable of timing control by an amount smaller than an interval corresponding to one pixel.

In this unit, a plurality of delayed clocks is generated by delaying a basic clock, and by the suitable selection of a synchronized basic clock which is in synchronism with the index signal or a delayed clock which is shifted by a specified period of time with respect to said synchronized basic clock, a clock of a desired timing is generated.

In this FIG. 8, a basic clock generator 311 generates a clock to become a reference. Further, a delay unit 312 for generating a plurality of delayed clocks consists of a group of delay elements for delaying an input signal (a basic clock from an oscillator 31) to give a plurality of delayed clocks which are different in the phase stepwise by a little amount (1/n of the period). In this case, it is desirable that the delay unit 312 is composed of delay elements connected cascadewise like a chain to have the number of stages capable of generating delayed clocks different in the phase stepwise by a little amount over the phase range of 2 periods of the basic clock. In addition, in this example, the delayed clocks are generated by the use of a group of delay elements, but it is also appropriate for the image forming apparatus to comprise a clock generator capable of generating a plurality of clocks having different phases respectively without the use of delay elements.

A state detecting unit 313 is a synchronism detecting means for detecting the number of the stage which is in synchronism with the basic clock (or some clock to become a reference) among plural clocks, and outputs synchronization information. In addition, it is possible to call this synchronization information a phase difference state, and this synchronization information (phase difference state) includes synchronization point information and the state of phase difference itself (phase difference state) to be described later.

In this example, it is desirable that the state detecting unit 313 can output the first synchronization point information V1st which becomes in synchronism with the basic clock first, the second synchronization point information which becomes in synchronism with the basic clock second, and the number of delay stages between them Vprd. In the examples of time charts shown in FIG. 9(*a*) to FIG. 9(*n*), the first synchronization point information V1st=20, the second synchronization point information V2nd=50, and the number of delay stages Vprd=30.

A selector 314 is a selection means for receiving the stage number selection information from a data calculator 345, selecting a clock of a timing to cause a state where the deviation of each remark point is corrected out of plural clocks and outputting it.

Besides, even if the delay time of the delay elements is changed owing to temperature fluctuation etc., it is possible to obtain the delay time of the delay elements from the synchronized stage number and select a clock of a suitable timing without fluctuation.

Further, as regards the circuit board equipped with the clock generator 310, because the whole of it is made up of digital circuits, the control of accuracy is easy. Further, because they are digital circuits, the circuit board has an advantage that its handling is easy.

Now, in the above-mentioned way, by the supply of a clock of a timing to correct the deviation of a remark point to the pulse generator 350, a PWM signal of a timing to correct the deviation of a remark point is generated. As the result of this, pixels formed by the print engine 500 are made to be outputted to their proper output positions.

That is, as regards the term "outputting an image signal at a specified timing based on a selected clock" stated in the structures (3) and (4), it is actualized by the generation of a PWM signal based on a clock pulse of a specified timing.

If a delayed clock is used, by the use of the image data $\lambda(\text{Int}(x+\gamma x))$ with the phase of the clock shifted by a time corresponding to the deviation $\text{Dec}(x+\gamma x)$, interpolation operation in the main scanning direction becomes unnecessary. Owing to this, a more desirable image can be obtained.

Besides, by the practice of the above-mentioned processing for each of the colors used in image formation (4 colors of Y, M, C, and K, for example), the component color images are formed at their proper positions; therefore, a registration error in the composite color image is also removed.

That is, by this Embodiment 2, it is possible to actualize an image forming apparatus capable of carrying out, for each pixel of the whole image surface, the correction of an image distortion and a registration error in a color image at a high accuracy within one dot.

(Embodiment 3)

FIG. 10 is a block diagram showing the structure of the Embodiment 3 of this invention. The same sign is attached to the same items as those shown in FIG. 1, and repeated explanations will be omitted.

Numeral 310 denotes a clock generator, and in this example of the embodiment, it outputs a delayed signal generated in a delay unit 311 as it is to selectors 348 and 349. Besides, the result of the detection of state in the state detector 313 is supplied to a data calculator 345.

That is, in the data calculator 345, it is determined of which timing a delayed signal of a delay unit 312 is to be selected in accordance with image data from an image storage 330, the result of the state detection of the delay unit 312, and the amount of deviation at each remark point (each pixel). Further, in selectors 347, 348, and 349, delay signals of timings corresponding to the rise and fall of a PWM signal respectively are selected and the PWM signal is generated in a pulse generator 350 (ex-OR).

Thus, in the above-mentioned way, by the generation of a PWM signal of such rise and fall timings as to correct the deviation of a remark point in the pulse generator 350, a pixel in an image to be formed by the print engine 500 comes to be outputted at the proper output position.

That is, as regards the term "outputting an image signal at a specified timing based on a selected clock" stated in the structures (3) and (4), it is realized by the generation of a PWM signal having specified rise and fall timings.

Besides, even if the delay time of the delay elements is changed owing to temperature fluctuation etc., it is possible to obtain the delay time of the delay elements from the synchronized stage number in the operation by the data calculator 345 and select a clock of a suitable timing without fluctuation. Further, as regards the circuit board equipped with the clock generator 310, because the whole of it is made up of digital circuits, the control of accuracy is easy. Further, because they are digital circuits, the circuit board has also an advantage that its handling is easy.

Besides, by the practice of the above-mentioned processing for each of the colors used in image formation (4 colors of Y, M, C, and K, for example), the component color images are formed at their proper positions; therefore, a registration error in the composite color image is also removed.

That is, by Embodiment 3, it is possible to actualize an image forming apparatus capable of carrying out, for each pixel of the whole image surface, the correction of an image distortion and a registration error in a color image at a high accuracy within one dot.

(Result of Correction by Each Embodiment)

Figure 11:
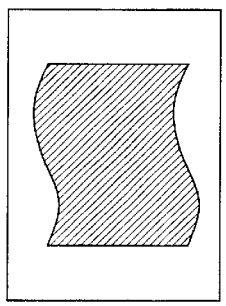
Figure 11:
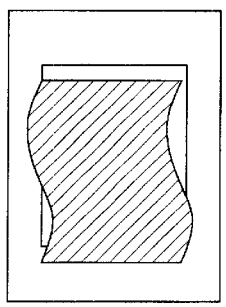
Figure 11:
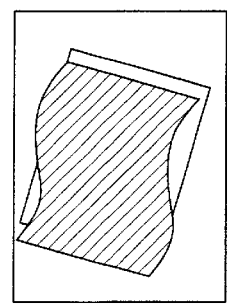
Figure 11:
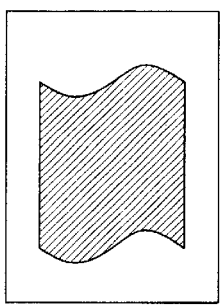
Figure 11:
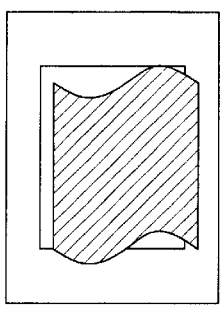
Figure 11:
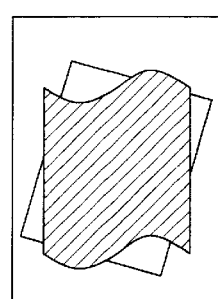
Figure 11:
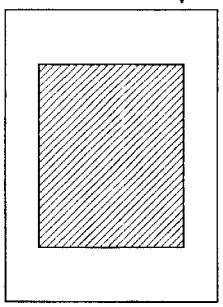
Figure 11:
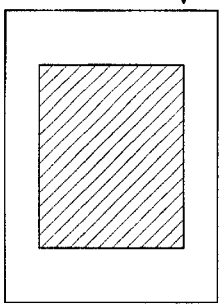
Figure 11:
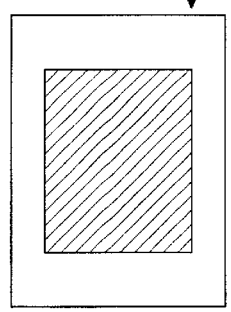

By each of the Embodiments of this invention, corrections can be made as shown in FIG. 11(*a*) to FIG. 11(*i*).

(1): In the above-mentioned Embodiment, positional deviations at the location of test patterns (desirably at the position of the characteristic points included in test patterns) are detected from image data obtained by the reading of a recording sheet having an image of the set of test patterns formed on it by an image reading means, and the positional deviations of the characteristic points from their proper output positions are detected. Further, with reference to the detected positional deviations of the characteristic points, operational values for the correction of every pixel are calculated, and by the use of this operational values, a processing for removing the positional deviation of every pixel in image formation is practiced. As the result of this, by the practice of the correction of image distortion (as shown in FIG. 11(a) or FIG. 11(b) for each pixel of the whole image surface at a high accuracy, an image as shown in FIG. 11(a) or FIG. 11(b) can be corrected to become as shown in FIG. 11(c).

(2): In the above-mentioned Embodiment, an image forming apparatus has a structure capable of forming a color image, reading a color image, and detecting a positional deviation in a color image, and a registration error of colors composing a color image is corrected. As the result of this, it is possible, by the practice of the correction of a registration error in a color image (as shown in FIG. 11(d) or FIG. 11(e)) at a high accuracy for each pixel of the whole image surface, to correct an image as shown in FIG. 11(d) or FIG. 11(e) to become as shown in FIG. 11(f).

(3): In the above-mentioned Embodiment, it is put into practice that the corner positions of a recording sheet is detected by a positional deviation detecting means, and the information on said corner positions are applied to the detection of positional deviations. As the result of this, it is possible, by the practice of the correction of an image distortion and a registration error in a color image (as shown in FIG. 11(g) or FIG. 11(h)) for specified positions at a high accuracy for each pixel of the whole image surface, to correct an image as shown in FIG. 11(g) or FIG. 11(h) to become as shown in FIG. 11(i).

Further, even in the case where an image forming apparatus of Embodiment of this invention uses a polygonal mirror and an fθ lens for the scanning of an image by a laser beam, it is possible to correct a deviation from the ideal characteristic of the fθ lens, a chromatic aberration of the fθ lens, an inclination from the ideal direction of the polygonal mirror, a deviation from the ideal position of the polygonal mirror, a deviation from the ideal characteristic in the reflection angle characteristic of the polygonal mirror, a deviation from the ideal values in the mounting position and an inclination of the photoreceptor, and further, in a color image forming apparatus of a tandem type for forming a color image, deviations relating to a plurality of fθ lenses, polygonal mirrors, laser beams, and photoreceptors, which exist in accordance with the number of colors used in the image formation, and a registration error in a color image.

Further, not only deviations existing at the time of shipping from a factory, but also deviations changing with the passage of time during use can be corrected effectively.

As explained in detail up to now, by this invention, an image forming apparatus capable of carrying out, for each pixel of the whole image surface, the correction of an image distortion and a registration error in a color image at a high accuracy can be actualized. Further, an image forming apparatus capable of carrying out, for each pixel of the whole image surface, the correction of an image distortion and a registration error at a high accuracy within one dot can be actualized.

What is claimed is:

1. An image forming apparatus comprising:
(a) an image reading device for reading an image on a document and for generating image data;
(b) an image forming device for forming an image on a recording sheet on the basis of the image data and for outputting the image;
(c) a pattern generator for generating pattern data for recording a set of test patterns at respective specified positions thereof on the recording sheet;
(d) a positional deviation detector for detecting a positional deviation at each characteristic point included in the set of test patterns generated by the pattern generator, in the image data read from the recording sheet on which the image containing the set of test patterns has been formed, by comparing with a position of the proper output at each characteristic point; and
(e) a deviation correcting device for calculating operational values for a correction of each pixel with reference to the respective positional deviations of the characteristic points detected by the positional deviation detector and for carrying out a processing to eliminate the positional deviation of each pixel at the time of image formation by using the operational values, thereby a deviation or an inclination of a document image to be formed from a document when the document is read by the image reading device is corrected.

2. The image forming apparatus of claim 1, wherein the positional deviation to be detected by the positional deviation detector and the positional deviation to be corrected by the deviation correcting device are deviations converted in a main scanning direction and in a sub-scanning direction.

3. The image forming apparatus of claim 1, wherein the deviation correcting device comprises:
a delay device for generating a plurality of clocks having the phase shifted stepwise by 1/n of a period from a basic clock;
a selector for selecting, at the time of correction of a positional deviation in the main scanning direction, a clock in accordance with the amount of the positional deviation; and
an output device for outputting an image signal at a specified timing based on the selected clock.

4. The image forming apparatus of claim 1, wherein the deviation correcting device comprises:
a delay device for generating a clock different from a basic clock in the timing by a specified interval;
a state detector for detecting a delay state of the delay device to which stage of the delay clock a certain pulse of the basic clock corresponds;
a selector for selecting, with reference to the delay state, at the time of correction of a positional deviation in the main scanning direction, a delayed clock from the delay device in accordance with the amount of the positional deviation; and
an output device for outputting an image signal at a specified timing based on the selected delayed clock.

5. The image forming apparatus of claim 1, having a structure which forms a color image, reads a color image, and detects positional deviation in the color image, and corrects a registration error for each color composing the color image.

6. The image forming apparatus of claim 1, wherein the positional deviation detector detects corner positions of the recording sheet and applies information on the corner positions to the detection of positional deviations.

* * * * *